United States Patent [19]

Siemers

[11] Patent Number: 4,786,566

[45] Date of Patent: Nov. 22, 1988

[54] SILICON-CARBIDE REINFORCED COMPOSITES OF TITANIUM ALUMINIDE

[75] Inventor: Paul A. Siemers, Clifton Park, N.Y.

[73] Assignee: General Electric Company, Schenectady, N.Y.

[21] Appl. No.: 10,882

[22] Filed: Feb. 4, 1987

[51] Int. Cl.[4] .......................... B05D 1/10; B32B 15/14

[52] U.S. Cl. .................................... 428/568; 428/937; 428/567; 427/34

[58] Field of Search .................. 427/34; 428/608, 937, 428/614, 567, 568, 569, 549, 553, 539.5

[56] References Cited

U.S. PATENT DOCUMENTS

| | | | |
|---|---|---|---|
| 3,264,508 | 8/1966 | Lai et al. | 313/63 |
| 3,427,185 | 2/1969 | Cheatham et al. | 427/34 |
| 3,575,783 | 4/1971 | Kreider | 161/143 |
| 3,606,667 | 9/1971 | Kreider | 427/34 |
| 3,717,443 | 2/1973 | McMurray et al. | 428/614 |
| 3,847,558 | 11/1974 | Trobocco et al. | 428/614 |
| 4,141,802 | 2/1979 | Duparque et al. | 428/608 |
| 4,370,789 | 2/1983 | Schilke et al. | 427/34 |
| 4,499,156 | 2/1985 | Smith et al. | 428/614 |
| 4,537,742 | 8/1985 | Siemers et al. | 419/8 |
| 4,574,451 | 3/1986 | Smashey et al. | 29/423 |
| 4,576,828 | 3/1986 | Walker, Jr. | 427/34 |
| 4,603,568 | 8/1986 | Siemers et al. | 72/47 |

FOREIGN PATENT DOCUMENTS

| | | | |
|---|---|---|---|
| 57-74115 | 5/1982 | Japan . | |
| 57-74117 | 5/1982 | Japan . | |
| 184652 | 9/1985 | Japan | 427/34 |
| 60-184652 | 9/1985 | Japan . | |
| 522248 | 10/1976 | U.S.S.R. | 428/608 |

OTHER PUBLICATIONS

F. H. Froes et al., "Titanium Rapid Solidification Technology", The Metallurgical Society, Inc., Mar. 1986, 6 pages.

Mash, D. R. et al., "Structure and Properties of Plasma Cast Materials", Metals Engineering Quarterly, Feb. 1964, pp. 18–26.

*Primary Examiner*—John J. Zimmerman

*Attorney, Agent, or Firm*—Paul E. Rochford; James C. Davis, Jr.; Paul R. Webb, II

[57] ABSTRACT

A method of forming a composite of fibers having high strength at high temperatures in a high temperature metal matrix is taught. The high strength fibers may be silicon carbide fibers. The fibers are aligned and disposed on a substrate surface. A metal to serve as a matrix is provided in powder form with relatively larger particles of the order of more than 100 μm. The powder is plasma spray deposited on the fiber coated substrate surface to cause the metal to at least partially envelop the fibers. The composite is then separated from the substrate.

15 Claims, 5 Drawing Sheets

SILICON-CARBIDE REINFORCED COMPOSITES OF TITANIUM ALUMINIDE

RELATED APPLICATIONS

The subject matter of the subject application relates generally to that of copending application Ser. No. 18,552, filed Feb. 25, 1987 and entitled "Method of Forming Reinforced Metal Matrix with Integral Containment for HIPing" and to the applications referenced therein. The text of this application and of the applications referenced therein are incorporated herein by reference.

BACKGROUND OF THE INVENTION

The present invention relates to composite structures for use at high temperature. More particularly, it relates to composites which are formed of materials having relatively lower density and yet which are able to exhibit improved Young's modulus as well as high strength properties at high temperatures.

There is increasing interest in substances and structures which have the capacity for displaying good stiffness at lower temperatures as well as high strength and other compatible physical properties at high temperatures. Where such structures are to be used as part of jet engines, there is also a premium attached to the low density or low weight of the structure. Potential lighter weight, high strength materials and structures which retain their strength at high temperature are difficult to identify and harder still to formulate or to construct. Such structures are nevertheless highly valuable and, because of their high value as components for jet engines, the cost of the materials and articles is considered secondary to the properties which they exhibit at the use temperatures.

Titanium aluminide, $Ti_3Al$, as well as other titanium base alloys, have been identified as potentially high strength at high temperature materials having favorable strength-to-weight ratios. Silicon-carbide filaments have been recognized as having very high longitudinal strength features and it has been proposed to form a desirable structure in which the silicon-carbide filaments serve as a reinforcement for titanium aluminide metal and other titanium base alloy bodies. It is anticipated that $Ti_3Al$ matrix composites will find application in wound rotors, casings, and other intermediate temperature, high stress applications.

At present, $Ti_3Al$ composites have been fabricated by rolling $Ti_3Al$ ingot to sheet of about 0.010 inch thickness and laying up alternate layers of $Ti_3Al$ sheet and arrays of SiC filaments or fibers to form a laminate. The laminate formed in this manner is then consolidated by hot pressing or hot isostatic pressing, i.e. HIPing. This prior art process is deemed to be inadequate and too expensive for use as a high production rate manufacturing process for formation of such composites.

Novel and unique structures are formed pursuant to the present invention by plasma spray deposit of titanium base alloys and titanium-aluminum intermetallic compounds employing RF plasma spray apparatus.

The formation of plasma spray deposits of titanium and of alloys and intermetallic compounds of titanium present a set of processing problems which are unlike those of most other high temperature high strength materials such as the conventional superalloys. A superalloy such as a nickel base, cobalt base or iron base superalloy can be subdivided to relatively small size particles of +400 mesh (about 37 μm) or smaller without causing the powder to accumulate a significant surface deposit of oxygen. A nickel base superalloy in powder form having particle size of less than −400 mesh will typically have from about 200 to about 400 parts per million of oxygen. A powdered titanium alloy of similar particle size by contrast will typically have a ten fold higher concentration of oxygen. A powdered titanium alloy of −400 mesh will have between about 2000 and 4000 ppm of oxygen.

Moreover, titanium alloy powder of less than −400 mesh size is recognized as being potentially pyrophoric and as requiring special handling to avoid pyrophoric behavior.

It is also recognized that the low temperature ductility of titanium alloys decreases as the concentration of oxygen and of nitrogen which they contain increases. It is accordingly important to keep the oxygen and nitrogen content of titanium base alloys at a minimum.

Prior art plasma spray technology is based primarily on use of direct current plasma guns. It has been recognized that most as deposited plasma spray deposits of the superalloys such as nickel, cobalt and iron base superalloys have had relatively low ductility and that such as sprayed deposits when in their sheet form can be cracked when bent through a sufficiently acute angle due to the low ductility.

I have discovered that RF plasma apparatus is capable of spraying powder of much larger particle size than the conventional DC plasma apparatus. I have discovered that particle sizes at least three times larger in diameter than those conventionally employed in DC plasma spray apparatus may be successfully employed as plasma spray particles and that the particle size may be as high as 100 μm to 250 μm and larger and as large as 10× as large as the −400 mesh powder previously employed in DC plasma spray practice.

This possibility of employing the larger powder particles is quite important for metal powders such as titanium which are subject to reaction and absorption of gases such as nitrogen and oxygen on their surfaces. One reason is that the surface area of particles relative to their mass decreases inversely to their diameters. Accordingly, a three fold increase in particle diameter translates into a 3 fold decrease in particle surface area. I have discovered that one result is that RF plasma spray deposited structures of titanium base alloys can be made with the aid of larger particles and that they accordingly have lower oxygen content than might be expected based on knowledge of prior art practices.

As used herein, the term titanium base alloy means an alloy composition in which titanium is at least half of the composition in parts by weight when the various alloy constituents are specified, in parts by weight, as for example in percentage by weight.

A titanium-aluminum intermetallic compound is a titanium base alloy composition in which titanium and aluminum are present in a simple numerical atomic ratio and the titanium and aluminum are distributed in the composition in a crystal form which corresponds to the simple numerical ratio such as 3:1 for $Ti_3Al$; 1:1 for TiAl and 1:3 for $TiAl_3$.

BRIEF STATEMENT OF THE INVENTION

It is accordingly one object of the present invention to provide a fiber reinforced titanium base metal strip or sheet structure of low weight and high strength and high modulus.

Another object is to provide a method of forming titanium aluminide metal structures reinforced by siliconcarbide fibers.

Another object is to provide a method for forming high temperature reinforced titanium base metal matrix structures.

Another object is to provide novel reinforced titanium base metal structures having at least one small dimension and said structures being reinforced by high temperature, high strength fibers.

Still another object is to provide a method by which silicon-carbide reinforced titanium aluminide structures can be fabricated with highly desirable properties.

Yet another object of the present invention is to provide a method by which silicon-carbide reinforced titanium alloy structures can be fabricated at relatively low cost to achieve a desirable set of properties on a reproducible basis.

Other objects and advantages of the present invention will be in part apparent and in part pointed out in the description which follows.

In one of its broader aspects, objects of the present invention may be achieved by providing a titanium base alloy powder of relatively large particle size, providing an RF plasma gun, disposing an array of silicon-carbide filaments onto a receiving surface and plasma spray depositing a layer of the titanium base alloy onto the deposited filaments and receiving surface by low pressure plasma deposition to form a metal impregnated silicon-carbide fiber sheet.

A number of the sheets thus formed may be then assembled and the sheets may be consolidated by hot pressing or HIPing.

A preferred method for depositing the trititanium aluminide is by means of an RF plasma gun of relatively high energy.

A composite of silicon carbide filaments in titanium base alloy can also be fabricated by slowly winding silicon-carbide filaments onto a drum surface and plasma spray depositing the titanium aluminide on the drum surface as the filament is also wound thereon. This procedure may be followed by consolidation of the product deposit by HIPing or by hot pressing.

BRIEF DESCRIPTION OF THE DRAWINGS

The description of the invention which follows will be understood more clearly if in reading the following specification reference is made to the accompanying drawings in which.

DETAILED DESCRIPTION OF THE PRESENT INVENTION

Figure 1:
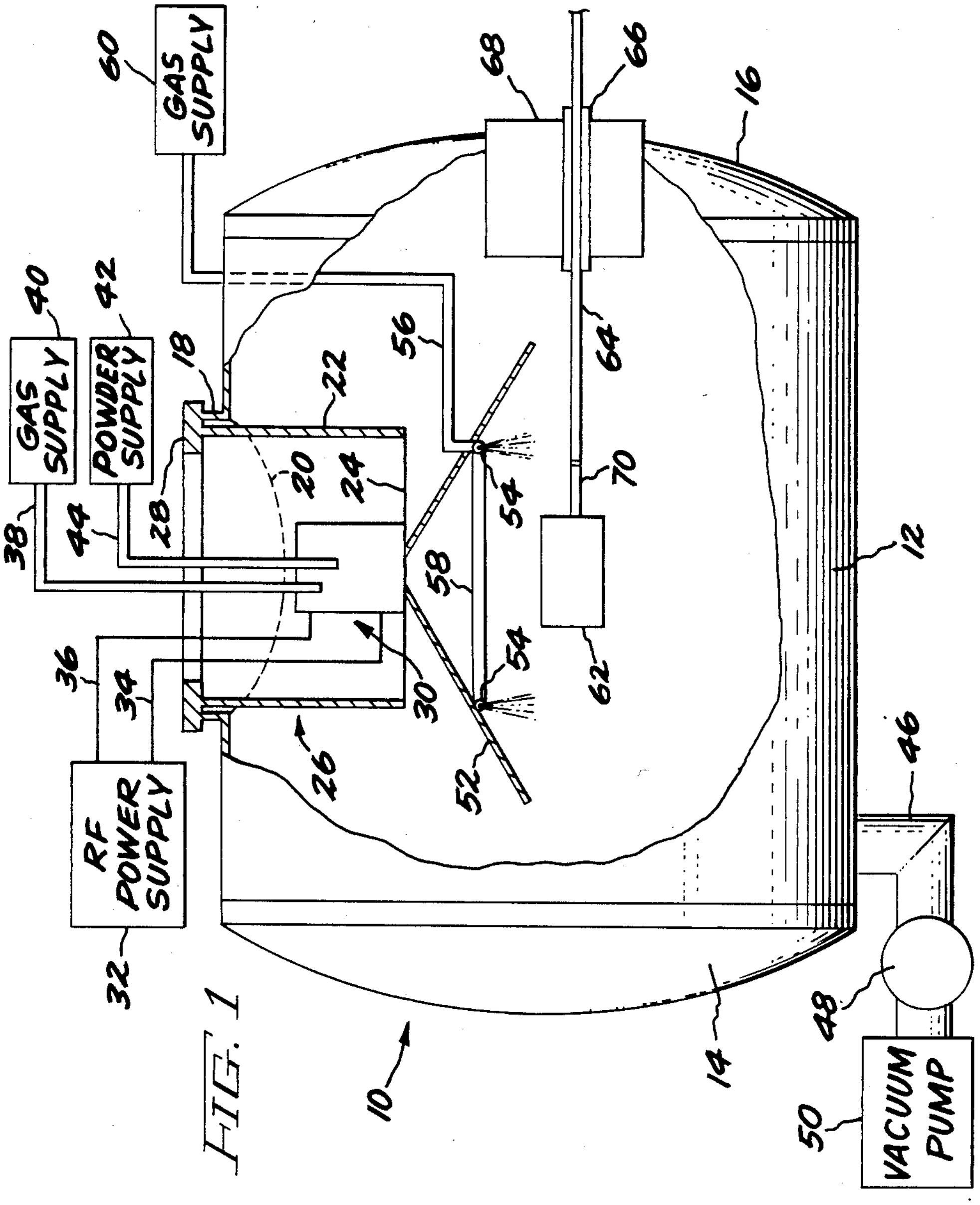
FIG. 1 is a schematic diagram of system for low pressure RF plasma deposition onto a rotating drum as a plasma spray receiving surface.

A low pressure radio frequency plasma spray deposit apparatus 10 is made up of a tank 12 having two removable end caps 14 and 16 and the associated apparatus as illustrated in FIG. 1. For the purposes of this invention, the tank may have a length of about 5 feet and a diameter of about 5 feet.

At the top of the tank 12 provision is made for introduction of a plasma gun into the top of the tank through an opening formed by cutting an opening in the tank wall and welding a collar 18 to the top of tank 12 along seam 20. The gun introduced into the tank is positioned within a container in the form of an inverted hat. The hat has sidewalls 22 and bottom wall 24 and has a rim 28 which seats on the collar 18 to provide a hermetic seal by techniques well known in the art.

The gun itself 30 is described in greater detail with reference to FIG. 2. The gun is mounted to the bottom wall 24 of the inverted hat container 26 and is supplied by power and by gas and powder entrained in a carrier gas.

An RF power supply 32 delivers power to the gun 30 over lines 34 and 36. Greater details of its operation are given below with reference to FIG. 2.

Gas is supplied to the interior of gun 30 from gas supply means 40 through supply means 38. Gas supply means 38 is representative of the means for supply of hydrogen gas or helium gas or argon gas or any mixture of gases as may be needed by the commercially available plasma gun such as a TAFA Model 66 used in connection with the Examples below. The specific gases employed depend on the material being plasma sprayed and the specific gases to be used are known in the art.

Also powder, entrained in a carrier gas, is supplied to the plasma gun from a powder supply means 42 through piping 44. A low pressure of 200 to 400 torr is maintained within the tank 12 by means of a pump 50 operating through valve 48 and line 46 connecting to the tank 12.

A problem of arc striking against wall interiors from the plasma was studied and was overcome by incorporation of a conical metal shield 52 extending down from gun 30 and by use of gas jets 54 disposed around the plasma flame from gun 30. Gas is supplied to the jets along the pipe 56 from exterior gas supply means 60. The jets are formed by openings drilled through an annular pipe mounted beneath conical shield 52 so that the pipe 58 shown in phantom serves as a conduit for the gas as well as providing the bottom drilled openings from which the gas jets 54 emerge.

The object illustrated as that to be coated by plasma spray deposit is a cylindrical drum 62 held at the end of an arm 64 extending through one end cap 16 of the tank 12. The arm 64 is hermetically sealed through the end cap 16 by a bushing 66 which is mounted within the box 68. Conventional means are provided in the box 68 for vertical positioning of the bushing 66 before the apparatus is evacuated. The rod may be raised or lowered to permit the position of drum 62 or other sample attached at the end of rod 64 to be adjusted to appropriate positions for the coating process to be performed prior to evacuation of the tank.

While the plasma spray deposition is in progress, sliding lateral positioning of the drum by inserting or withdrawing rod 64 through bushing 66 is also feasible and the drum is subject to rotation by imparting a rotary motion to the external portion of rod 64 by conventional means.

Figure 2:
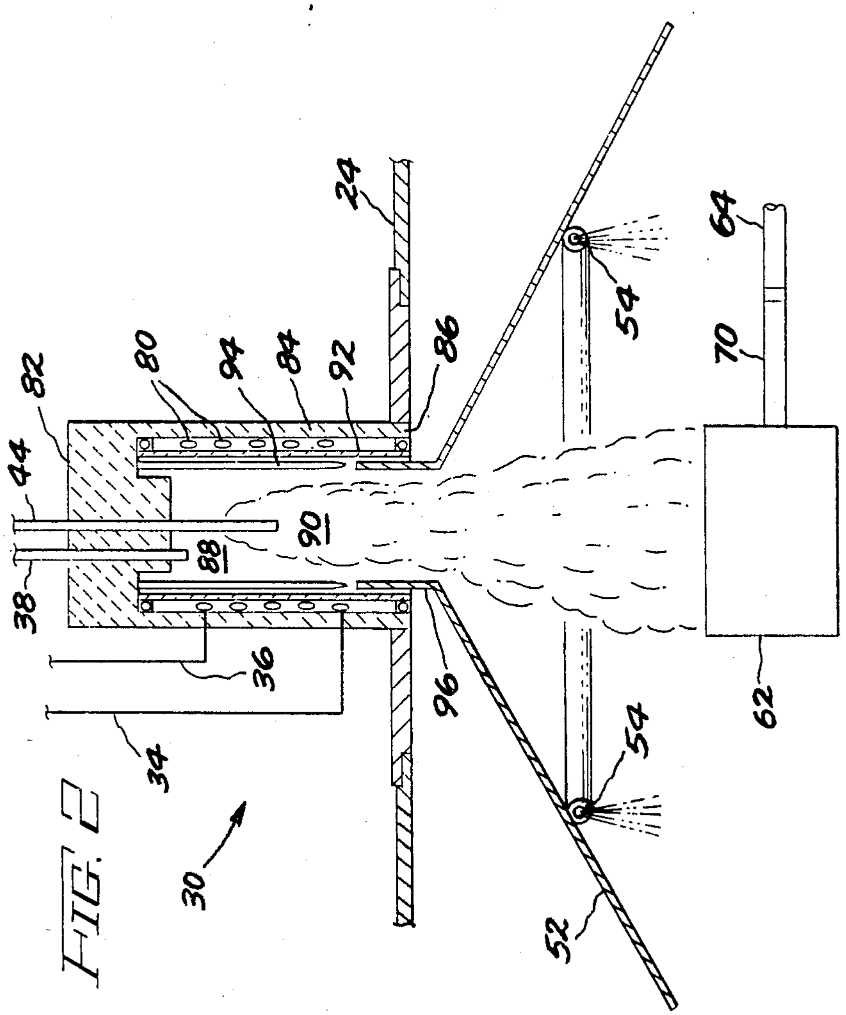
FIG. 2 is a schematic illustration of some details of a low pressure RF plasma gun and deposition apparatus.

Turning now to FIG. 2, a more detailed description of the plasma gun and its operation is provided.

The elements shown in both FIGS. 1 and 2 which bear the same reference numerals are the same articles. It is evident from FIG. 2 that the gun 30 has electric supply means 34 and 36 which are the same as those illustrated in FIG. 1. These means are known in the art to be hollow tubes which carry the RF energy and which also carry water to and from the gun for water cooling. Water cooling is necessary because of the high temperatures of 10,000 to 12,000 K. generated within the gun.

The gun 30 is provided with a housing, which includes a closed top wall 82, side walls 84 and a lower opening 86 from which the plasma flame extends.

Also the gas supply means 38 and powder supply means 44 are provided in supply relationship to the elements of gun 30 as they were in FIG. 1. The powder injection probe 44 in the gun is also water cooled.

Powder supply means 44 is a triple wall tube having a hollow innermost center tube for supply of powder and carrier gas. The triple wall is made up of a set of three concentric tubes having a cooling liquid, such as water, flowing in cooling relation in the inner and outer passages between the concentric tubes of powder supply means 44.

The gas is injected from means 38 into the top of the chamber 88 within gun 30 and above the zone in chamber 88 where the plasma is formed. The plasma itself is generated by having the radio frequency power impressed on the gas within the chamber 88. A suitable frequency range is from 2 to 5 megahertz and the lower end of this range is preferred.

The RF power is delivered through the lines 34 and 36 to a helical coil built concentric to the sidewalls 84 of the gun 30, individual strands 80 of which are evident in section in the FIG. 2. The RF coil made up of strands 80 is separated from the chamber 88 and plasma 90 by a quartz tube 92 mounted as a liner within the gun 30. A water cooled copper liner 94 has been found to assist the operation of the gun at higher powers.

The space between gun walls 84 and quartz tube is flooded with water (the coils are in water), so one side of the quartz is directly water cooled.

An exit baffle 96 assists in orienting the flame of the plasma gun 30. The plasma 90 extends from the bottom of the gun downward into heat delivering relation to the drum 62 mounted at the end of rod 64 by a bolt 70.

As explained above, the combination of the stainless steel shield 52 and the gas jets 54 have been successful in preventing an arcing or striking back from the plasma to the walls of the container of the low pressure plasma deposition apparatus 10 as illustrated in FIG. 1.

In operation a gas or combination of gases is passed through supply means 38 into chamber 88 and the pressure of this gas is kept at a low value of about 250 torr by the action of vacuum pump 50 operating through valve 48 and pipe 46 on the low pressure plasma deposition apparatus including tank 12. The tank itself has a length of about five feet and also a diameter of about five feet. Radio frequency power is impressed on the strands 80 of the coil to excite the gas passing into the housing through tube 38. A plasma 90 is generated within the housing of gun 30. The plasma extends out from the housing and heats the surface of rotating drum 62. The temperature of the plasma is about 10,000 to 12,000 K.

Powder particles, entrained in a carrier gas, are introduced into the plasma through tube 44. The heat of the plasma 90 is sufficiently high to cause a fusion of the particles as they move through the plasma and are then deposited as liquid droplets onto the surface of the drum 62. I have found that the plasma from the RF gun as described above will fuse particles of relatively large diameter of more than 100 $\mu$m and will cause them to deposit on a receiving surface from essentially a liquid state.

The vacuum system is operated to maintain a pressure of approximately 250 torr in the low pressure plasma deposition chamber within the container 12. The drum 62 is rotated within the evacuated chamber as the plasma is used to melt particles into molten droplets to be deposited on the surface of the drum.

The powder feed mechanism 42 is a conventional commercially available device. One particular model used in the practice of this invention was a powder feeder manufactured by Plasmadyne, Inc. of California. It is equipped with a canister on top that holds the powder. A wheel at the bottom of the canister rotates to feed powder into a powder feed hose 44. The powder is then carried by the carrier gas from the powder feeder along the hose 44 to the chamber 88 of gun 30.

Figure 3:
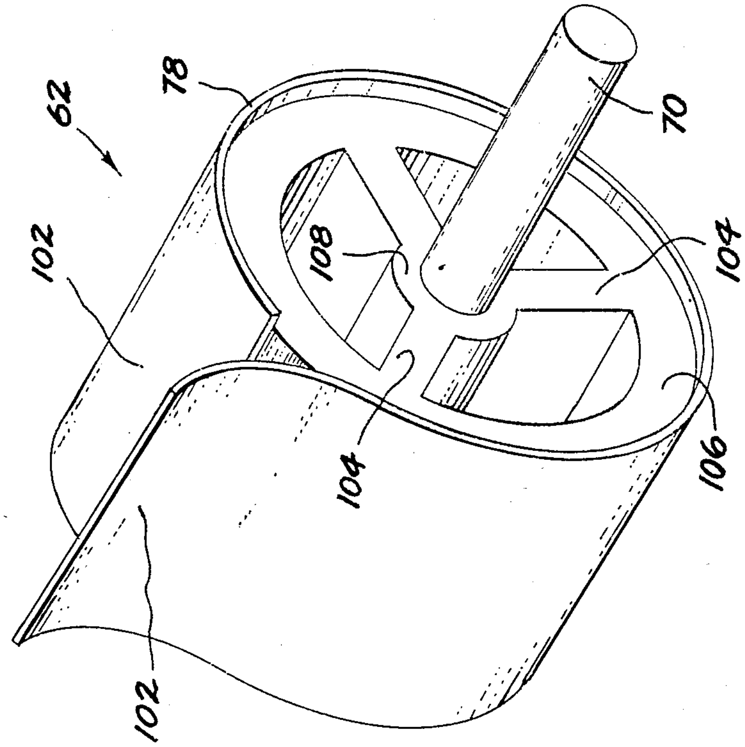
FIG. 3 is a schematic rendering of a drum adapted for receiving a web of fibers and a deposit of matrix metal on its cylindrical surface.

Turning now to FIG. 3, a schematic illustration of a drum having a substrate foil mounted partially thereon is provided. The drum 62 is formed to receive a preformed foil, such as 102, on its external surface. The foil desirably extends over the longitudinal edge of the drum so that any material received thereon will deposit on the foil and not on the drum. Drum 62 may be formed with an internal set of ribs 104 extending between an outer wall 106 and an inner axially disposed central axle 108. A shaft 70 extends outward from axle 108 and is a means by which the drum 62 is supported within a low pressure plasma apparatus such as enclosure 12 of FIG. 1. Foil 102 may be clamped into place on drum 62 by conventional means which are not illustrated in FIG. 3.

In operation, the drum is covered with a foil of metal or with some relatively inexpensive mandrel material. Following the covering of the drum with the foil an array of silicon carbide filaments or fibers is mounted onto the foil covered drum. The filaments are of reinforcing nature. Such a set of filaments may be formed of a carbon fiber core onto which a silicon carbide layer has been deposited by chemical vapor deposition. The outer surface of such a filament may be suitably coated with one or more layers of another coating material such as carbon through chemical vapor deposition or similar technique to provide desired protection of the filament surface.

One such filament is available from Avco Company under the trade designation SCS-6. It is this filament which was used in the studies leading to this invention. This SCS-6 SiC filament may be a single filament on a spool of continuous filament.

This type of filament has a 30 μm diameter carbon core on which silicon carbide is coated by chemical vapor deposition. The coating of SiC is 55 μm thick.

Figure 5:
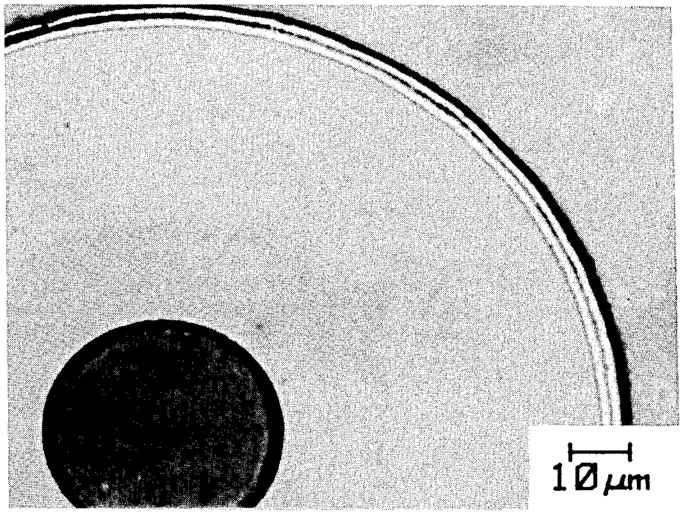
FIG. 5 is a cross sectional micrograph view of a silicon carbide fiber such as may be used in connection with this invention.

The outer surface of the SiC coating has two 1.0 to 1.5 μm thick pyrolytic carbon layers to give the filament an overall or total diameter of about 142 μm. A photomicrograph of a section through such a filament is shown in FIG. 5.

The carbon core serves as a substrate for the deposition of the SiC which is the structural part of the filament. The carbon surface layers are intended to minimize interaction between the SiC and the matrix material of the composite.

The filament was prepared at least in part by the processes taught in one or more of the U.S. patents assigned to Avco Corp. as follows: U.S. Pat. Nos. 4,068,037; 4,127,659; 4,481,257; 4,315,968; 4,340,636; and 4,415,609.

As part of their quality control, the manufacturer has measured the tensile strength of the filament on the spool as 3150 MPa which is equivalent to 450 ksi. The strength of the filaments was thus somewhat below the values of 3450 to 4140 MPa generally credited to this type of filament.

The manufacturer, Avco Corp., gave a value of the modulus of the SCS-6 filaments as being 500 GPa.

Other filaments usable in practice of the present invention include high strength, high temperature carbon filaments.

An array of such filaments in parallel is formed on the preformed foil which is mounted to the drum. The drum is rotated and translated axially and the plasma flame is played on the fiber bearing foil covered surface of the drum. A powder of the desired titanium base alloy composition is introduced into the plasma powder feed supply and the drum is sprayed in the low pressure plasma deposition apparatus until a plasma spray of desired sheet thickness is obtained on the surface of the substrate foil and fibers. For formation of a highly reactive alloy sheet, such as a titanium alloy, use of a plasma gun powered by radio frequency is needed in depositing the desired alloy. A radio frequency plasma gun is commercially available and may be obtained, for example, from TAFA Corp. of California, U.S.A. A TAFA model 66 may be employed, for example.

Figure 4:
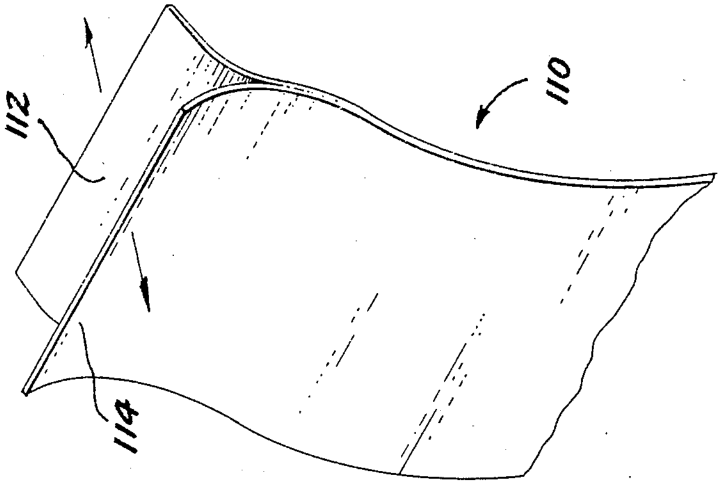
FIG. 4 is a detailed view of a composite foil formed of a titanium alloy on a preformed foil which may be of molybdenum, for example, and showing the two foils being separated from one edge by peeling.

Following deposit of the titanium layer onto the filaments and preformed foil mounted on the platen surface the plasma spray process is terminated and the platen is removed from the low pressure plasma apparatus 10. The preformed substrate foil bearing the deposited titanium is separated from the drum. The preformed foil substrate is then dissolved away from the fiber and titanium deposit so that the reinforced titanium deposit is recovered as a separate self-supporting element.

Where the foil employed is a foil of molybdenum and where the temperature of the foil is not excessively high at the time of the deposition, it has been found possible to separate a deposit of titanium from the molybdenum foil simply be peeling them apart as illustrated in FIG. 4. In such case, there is no need to dissolve the molybdenum away from the titanium deposit in order to effect a complete separation. In FIG. 4 composite structure 110 is seen to be made up of preformed foil 112 and the plasma deposited foil 114. Separating force may be applied in the directions illustrated by the arrows to effect a separation of the plasma deposited foil from the preformed foil where the preformed foil is composed of molybdenum and has not been excessively heated by the plasma deposition process.

A typical run might be carried out undr the following conditions:

A power input of 60 Kilowatts

A tank pressure of 250 torr

Gas flow rates for a TAFA Model 66:

| | |
|---|---|
| Radial, Argon | 117 liters/min. |
| Swirl, hydrogen | 5 liters/min. |
| Swirl, argon | 16 liters/min. |
| cold jet argon | 106 liters/min. |

Particle Injection:

| | |
|---|---|
| Carrier, Argon | 5 liters/min. |
| Powder, Ti Base Alloy | 210–250 μm |
| Injection point above nozzle | 7.45 cm. |

Deposition Data:

| | |
|---|---|
| Target Material | Preformed Steel Foil |
| Target Size | 4" wide 7" diam. drum |
| Distance Target Nozzle | 11.5" |
| Preheating Time | none |
| Deposition Time | 3 min. |
| Deposition Rate | 30 grams/min. |
| Mass Deposition efficiency | 90–95% |

EXAMPLE 1

A sample of trititanium aluminide, $Ti_3Al$, alloy powder (Ti-14Al-21Cb) was obtained and screened to a variety of mesh sizes employing the apparatus and procedures described above. RF plasma spray trials were initiated to deposit a layer of $Ti_3Al$ metal on a preformed foil mounted to a drum. It was found that the RF plasma spray gun could deposit $Ti_3Al$ at a density approaching a full density and that this could be accomplished with use of available powders having average particle size of up to 250 microns in diameter. This indicated that deposits could be formed from powders having particles larger than 250 microns.

The measured oxygen contents of the starting powder ranged from 1,300 ppm (parts per million) for the finer mesh sizes to as low as 900 ppm for the 250 micron diameter powders. The spray deposits had oxygen contents ranging from 1,900 ppm for the larger particle powders to 2,300 ppm for the smaller particle powders.

The as-deposited titanium aluminide was separated from the preformed foil. The as-deposited titanium layer was bent until it fractured. Fracture of the RF deposited material and particularly the manner in which it fractured, including the degree of bending needed to fracture it, indicated that it is strong and that it may have some limited ductility.

EXAMPLE 2

A sample of $Ti_3Al$ alloy ingot (Ti-14Al-21Cb) was obtained. The ingot was converted to powder by the hydride-dehydride process. Some −400 mesh hydride-dehydride power was taken from this material. Some −400 mesh powder which had been hydrided but had not been dehydrided was also selected.

EXAMPLE 3

Tests were conducted of a DC arc plasma deposition of $Ti_3Al$ alloy (Ti-14Al-21Cb) in both the dehydrided and hydrided condition. A DC arc plasma deposition apparatus is described in U.S. Pat. No. 4,603,568 issued Aug. 5, 1986. Micrographs of the deposits formed indicated that DC arc sprayed $Ti_3Al$ was not fully dense. In addition, the material deposited by the arc process fractured easily and showed no evidence of ductility.

No effort was made to form a composite of $Ti_3Al$ with silicon-carbide fiber using DC arc plasma deposition inasmuch as the porosity of the deposit appeared to be too high and the ductility appeared to be too low.

EXAMPLE 4

A preassembled lay up of a single layer of parallel silicon-carbide filaments was provided. The spacing of the fibers was about 128 per inch. This lay up or preassembled array of filaments was clamped to a flat steel plate. The silicon-carbide filaments disposed on the plate were then plasma spray coated with 0.010 inch thick layer of $Ti_3Al$ alloy (Ti-14Al-21Cb). The $Ti_3Al$ deposit was formed from powder prepared by the hydride-dehydride process using an RF plasma gun as described above.

Microscopic analysis of the composite of $Ti_3Al$ and silicon carbide filaments showed that $Ti_3Al$ metal had penetrated between the filaments of the lay up on the sprayed side. A photomicrograph showing an array of silicon carbide filaments embedded in an as-deposited layer of a nickel base titanium alloy is provided in FIG. 6.

One factor which contributes to the remarkable success of the composites formed by the methods of the present invention is the very rapid manner in which the filaments are enveloped by the titanium base alloy. Because of the unique envelopment phenomena, the results of which are illustrated in FIG. 6, by which the molten metal is impelled like raindrops into contact with the filaments and proceeds to fall through and around the underside of the filaments to envelop them in a vary rapidly solidified metal, there is very little chance for reaction to occur between the titanium base metal and the material of the fiber.

The SCS-6 fiber has two pyrolitic carbon surface layers. The molten titanium metal effectively forms a sheath around each of the fibers without destroying the surface carbon layers. Accordingly, for the as deposited titanium metal, the carbon surface layers are effectively preserved. This structure effectively reduces or prevents reaction between the titanium metal and the silicon carbide of the filaments.

Figure 6:
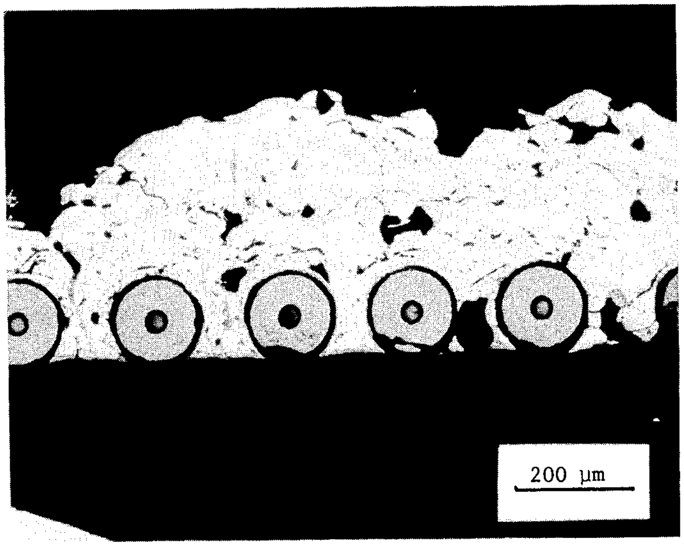
FIG. 6 is a sectional micrograph of an array of silicon carbide fibers and an as-deposited matrix of titanium base metal.

When the single layer RF formed composite is later mounted together with other similar RF formed composites to form a multilayer composite and the several layer composite is compacted into a form as illustrated in FIG. 6, there is no need for extensive flow of titanium matrix metal to produce the final compact form of the structure. This is because the individual filaments are already substantially enveloped in the titanium base alloy and the alloy accordingly does not have to flow between the filaments. For this reason a shorter time of HIPing than that employed in conventional prior art practice employing foils and fiber mats is deemed feasible.

EXAMPLE 6

Figure 7:
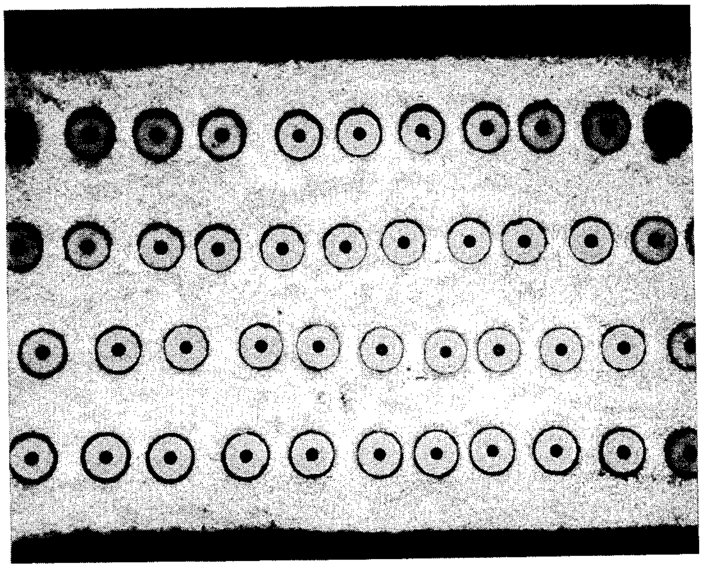
FIG. 7 is a cross sectional micrograph of an array of silicon carbide fibers embedded in a matrix of titanium base metal which has been consolidated by hot isostatic pressing.

Samples of the material prepared as described in Example 4 were consolidated by HIPing. A photomicrograph of a set of four filament reinforced sheets, and one filament free sheet, which have been consolidated by HIPing is provided in FIG. 7. Conventional HIPing time and temperature were used in forming this structure. A novel feature of this structure is that the knit lines for the forming of one layer to another occur along an approximate tangent line to the several filaments in a row rather than at the point of closest approach of the filaments as in prior art structures.

EXAMPLE 5

The procedure of Example 4 was repeated but in this example the titanium alloy plasma sprayed was Ti-6Al-7Sn-4Zr-2Mo also known under the designation Ti-6242.

The initial tensile strength of the composite prepared in this manner was evaluated based on the rule of mixtures. The rule of mixtures specifies that the tensile property of each component contributes to the tensile property of the composite based on the volume fraction in which each component is present.

The volume fraction of silicon carbide filaments present was 22 volume percent. The titanium alloy alone has a tensile strength of 140 ksi at room temperature. The composite was found to have the following tensile strengths:

| Temperature | Tensile Strength |
|---|---|
| Room | 18 ksi |
| 600° F. | 188 ksi |
| 1000° F. | 167 ksi |
| 1200° F. | 132 ksi |

These strengths closely match the theoretical strength which is suggested by the rule of mixtures.

Thus, the composite had a substantially higher tensile strength at 1000° F. than the titanium alloy itself did at room temperature.

These data demonstrate the feasibility of RF processed titanium alloy systems to be used as matrix materials for the fabrication of light weight high strength metal composite components.

As used herein, the phrase high strength, high temperature filaments means filaments which have tensile strength in excess of that of a host matrix metal such as a titanium base metal in which they are embedded as reinforcing filaments and preferably greater than 200 ksi. Such filaments are high temperature filaments if they are able to retain high tensile strength at use temperatures above 1000° C. which are greater than a host matrix metal such as a titanium base metal in which they are embedded.

Alternative filaments usable in connection with the present invention include high strength, high temperature fibers of carbon, aluminum oxide, or beryllium oxide.

What is claimed and sought to be protected by Letters Patent of the United States is as follows:

1. The method of forming filaments reinforced metal matrix materials which comprises disposing an array of aligned high strength high temperature filaments on a receiving surface providing, in powdered form, a particulate titanium base metal of average particle size of at least 100 μm to serve as a matrix to said fibers, radio frefquency plasma spray depositing said metal particles onto said array of filaments to at least partially impregnate said array and embed said filaments in the metal foil deposit formed by said plasma spray.

2. The method of claim 1 in which the high strength, high temperature filaments are of silicon carbide.

3. The method of claim 1 in which the radio frequency used is between 2 and 5 megahertz.

4. The method of claim 1 in which the radio frequency used is between 2 and 3 megahertz.

5. The method of claim 1 in which the titanium base alloy is Ti-6Al-4V.

6. The method of claim 1 in which the titanium base alloy is Ti-6242.

7. The method of claim 1 in which the titanium base alloy is Ti-14Al-21Cb.

8. The method of claim 1 in which the titanium base alloy is TiAl.

9. The method of claim 1 in which the titanium base alloy is $TiAl_3$.

10. A composite structure comprising a plurality of aligned high strength, high temperature filaments, said filaments being directly embedded in a host metal formed by low pressure RF plasma spray depostion around said filaments of rapidly solidified particulate titanium base alloy metal of average particle size of at least 100 μm.

11. The composite structure of claim 10 in which the oxygen content of the titanium base alloy is below 2000 ppm.

12. The composite structure of claim 10 in which the average host metal foil thickness is no more than 4 times that of the diameters of filaments embedded therein.

13. The composite structure of claim 10 in which the volume percent of filament present in the host foil is between 3 and 80%.

14. The composite structure of claim 10 in which the volume percent of filaments present in the host metal foil is between 20 and 40%.

15. A composite structure comprising a plurality of layers of aligned high strength, high temperature filaments, said filaments being embedded in a host titanium base matrix material formed by low pressure RF plasma spray deposition of particles of said titanium base metal of average particle size of at least 100 μm, said host titanium base matrix metal being made up from layers which are consolidated at high temperature and pressure, and the interfaces at which said layers are joined lying generally along tangent lines extending from aligned filaments, said tangents lying generally parallel to each other.

* * * * *